US010996338B2

(12) United States Patent
Kuffner (10) Patent No.: US 10,996,338 B2
(45) Date of Patent: May 4, 2021

(54) SYSTEMS AND METHODS FOR DETECTION BY AUTONOMOUS VEHICLES

(71) Applicant: TOYOTA RESEARCH INSTITUTE, INC., Los Altos, CA (US)

(72) Inventor: James Kuffner, Saratoga, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 510 days.

(21) Appl. No.: 15/701,695

(22) Filed: Sep. 12, 2017

(65) Prior Publication Data
US 2019/0079194 A1 Mar. 14, 2019

(51) Int. Cl.
*G01S 17/93* (2020.01)
*G01S 17/931* (2020.01)
(Continued)

(52) U.S. Cl.
CPC .......... *G01S 17/931* (2020.01); *G05D 1/0088* (2013.01); *G05D 1/0242* (2013.01);
(Continued)

(58) Field of Classification Search
CPC ......... G05D 2201/0213; G05D 1/0088; G05D 1/024; G05D 1/0246; G05D 1/0214; G05D 1/0257; G05D 1/0231; G05D 1/021; G05D 1/0242; G05D 1/0248; G05D 1/0238; G05D 1/0276; G05D 1/0225; G05D 1/0251; G05D 1/0234; G05D 1/02; G05D 23/27; G01S 7/4817; G01S 13/931; G01S 17/023; G01S 17/026; G01S 17/931; G01S 15/8993;
(Continued)

(56) References Cited

U.S. PATENT DOCUMENTS 5,202,742 A 4/1993 Frank et al.
5,734,736 A 3/1998 Palmer et al.
(Continued)

FOREIGN PATENT DOCUMENTS

EP 2006708 A1 * 12/2008 ............ G01S 13/46
JP 2016-75570 A 5/2016

OTHER PUBLICATIONS

Machine translation of EP2006708A1 (Year: 2008).*

*Primary Examiner* — Tuan C To
*Assistant Examiner* — Paul A Castro
(74) *Attorney, Agent, or Firm* — Oblon, McClelland, Maier & Neustadt, L.L.P.

(57) ABSTRACT

According to aspects of the disclosed subject matter, an active non-visible reflective system can include one or more retroreflective sections coupled to one or more predetermined locations on an object designated for active non-visible reflection. The one or more retroreflective sections can be configured to actively reflect at least a portion of a predetermined frequency of incoming radiation back to a source of the incoming radiation, the incoming radiation being non-visible, wherein the one or more predetermined locations are illuminated. Additionally, the one or more retroreflective sections can be further configured to enable a perception system to determine that one or more retroreflectors are detected in response to the illumination, and enable processing circuitry communicably coupled to the perception system to detect the illuminated object defined by the one or more detected retroreflective sections.

26 Claims, 7 Drawing Sheets

(51) Int. Cl.
*G08G 1/16* (2006.01)
*G05D 1/00* (2006.01)
*G08G 1/04* (2006.01)
*G05D 1/02* (2020.01)
*G08G 1/015* (2006.01)

(52) U.S. Cl.
CPC .............. *G08G 1/015* (2013.01); *G08G 1/04* (2013.01); *G08G 1/162* (2013.01); *G08G 1/166* (2013.01); *G08G 1/167* (2013.01); *G05D 2201/0213* (2013.01)

(58) Field of Classification Search
CPC ............. G01S 7/52066; G01S 7/52073; G01S 7/52074; G08G 1/166; G06T 19/00; G06T 2210/41; G06T 2207/30204; G06T 15/00; G06T 2207/10081; G06T 7/73; G06T 7/74; G06T 15/08; G06T 15/20; G06T 2200/04; G06T 2207/30016; G06T 7/337; G06T 11/008; G06T 13/20; G06T 15/506; G06T 19/003; G06T 19/006; G06T 2207/10116; G06T 2207/30012; G06T 2207/30101; G06T 2215/12; G06T 2215/16; G06T 2219/2016; G06T 5/50; G06T 7/0014; G06T 2207/10016; G06T 2207/10088; G06T 2207/10136; G06T 2207/20228; G06T 2207/30004; G06T 2207/30008; G06T 2207/30036; G06T 2207/30041; G06T 2211/421; G06T 5/003; G06T 5/005; G06T 5/20; G06T 7/00; G06T 7/0012; G06T 7/11; G06T 7/174; G06T 7/246; G06T 7/248; G06T 7/33; G05B 19/4099; G05B 2219/49023; G02B 27/017; G02B 21/0012; G02B 21/22; G02B 21/365; G06K 19/06131; G06K 2009/3225; G06K 2209/057; G06K 9/0063; G06K 9/3216; G06K 2009/00939; G06K 2009/2045; G06K 2209/05; G06K 2209/40; G06K 9/00134; G06K 9/00335; G06K 9/00671; G06K 9/00892; G06K 9/32; G06K 9/6202; H04N 19/44; H04N 13/128; H04N 13/361; H04N 19/12; H04N 19/14; H04N 19/176; H04N 19/436; H04N 19/593; H04N 19/625; H04N 19/91; H04N 5/64; A63F 13/213; A63F 13/655
See application file for complete search history.

(56) References Cited

U.S. PATENT DOCUMENTS

| | | | |
|---|---|---|---|
| 5,812,267 A | 9/1998 | Everett, Jr. et al. | |
| 6,711,280 B2 | 3/2004 | Stafsudd et al. | |
| 6,910,660 B2 | 6/2005 | Lecroy, Jr. | |
| 7,085,637 B2 | 8/2006 | Breed et al. | |
| 9,097,800 B1 * | 8/2015 | Zhu | G01S 7/4802 |
| 10,008,116 B1 * | 6/2018 | Sandbrook | G08G 1/144 |
| 2006/0114477 A1 * | 6/2006 | Cox | G01B 11/25 |
| | | | 356/602 |
| 2015/0303581 A1 | 10/2015 | Bodo | |
| 2016/0084944 A1 | 3/2016 | Bialer et al. | |
| 2017/0001311 A1 * | 1/2017 | Bushman | A47L 9/2852 |
| 2018/0342065 A1 * | 11/2018 | Hovis | G05D 1/0088 |

* cited by examiner

SYSTEMS AND METHODS FOR DETECTION BY AUTONOMOUS VEHICLES

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The number of semi-autonomous and fully autonomous vehicles continues to increase. These autonomous vehicles may depend entirely on automated methods of detecting other vehicles, requiring more robust detection and classification techniques. For example, vehicles with black paint are currently the most difficult for autonomous vehicles to detect. In other words, the reliability and confidence an autonomous vehicle has when detecting other vehicles can depend on the paint color of the vehicle.

SUMMARY

The foregoing paragraphs have been provided by way of general introduction and are not intended to limit the scope of the following claims. The described embodiments, together with further advantages, will be best understood by reference to the following detailed description taken in conjunction with the accompanying drawings.

According to aspects of the disclosed subject matter, an active non-visible reflective system can include one or more retroreflective sections coupled to one or more predetermined locations on an object designated for active non-visible reflection. The one or more retroreflective sections can be configured to actively reflect at least a portion of a predetermined frequency of incoming radiation back to a source of the incoming radiation, the incoming radiation being non-visible, wherein the one or more predetermined locations are illuminated. Additionally, the one or more retroreflective sections can be further configured to enable a perception system to determine that one or more retroreflectors are detected in response to the illumination, and enable processing circuitry communicably coupled to the perception system to detect the illuminated object defined by the one or more detected retroreflective sections.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference operations and/or functions as described herein, and likewise do not necessarily limit embodiments of the disclosed subject matter to any particular configuration or orientation.

Referring now to the drawings, wherein like reference numerals designate identical or corresponding parts throughout the several views.

Figure 1:
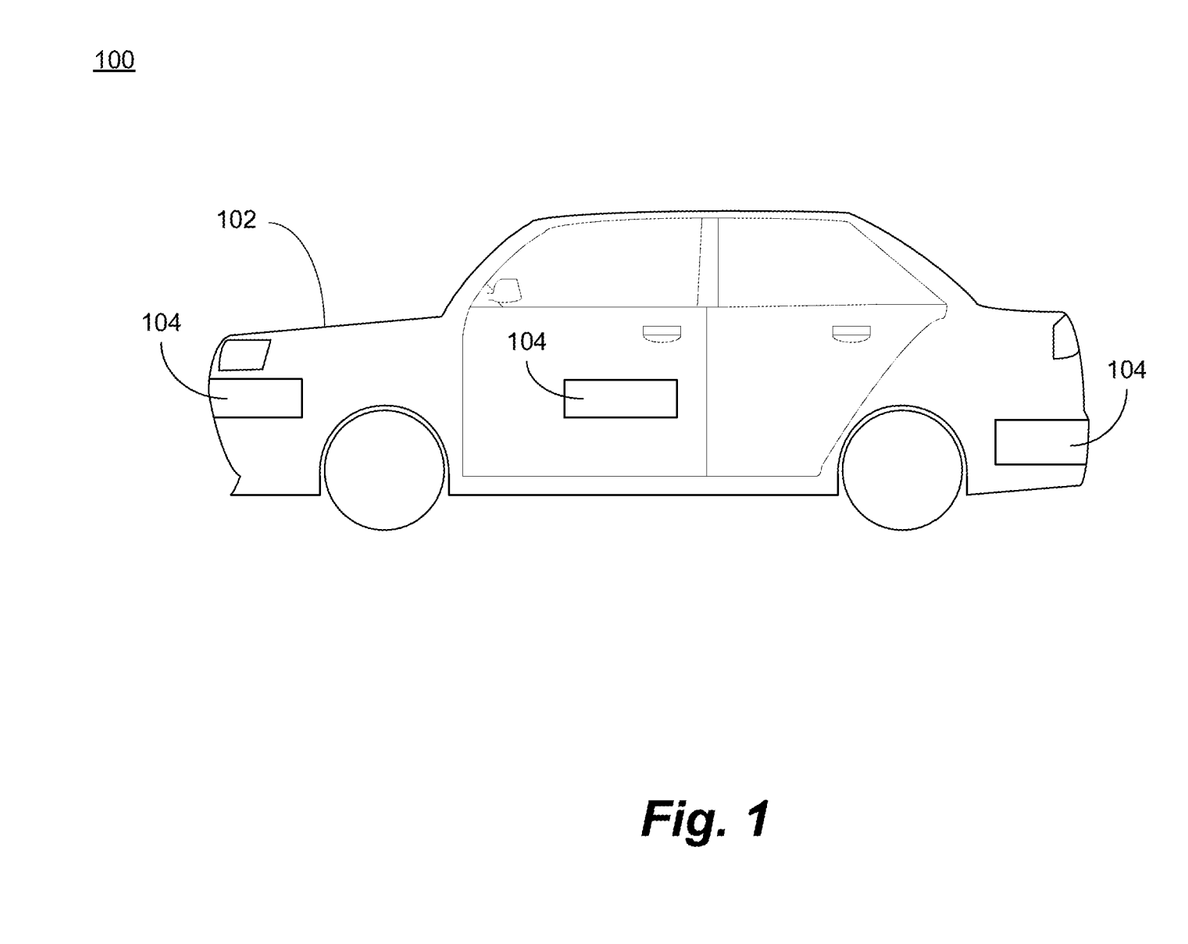
FIG. 1 depicts an exemplary overview of a vehicle including one or more retroreflective sections according to one or more aspects of the disclosed subject matter.

FIG. 1 depicts an exemplary overview of a vehicle 102 including one or more retroreflective sections 104 according to one or more aspects of the disclosed subject matter. The vehicle 102 and the integrated retroreflective sections 104 can be an active non-visible reflection system 100. The retroreflective sections 104 can improve detection of the vehicle 102 by autonomous vehicles. The retroreflective sections 104 can be optimized for one or more sensors in a perception system used by autonomous vehicles to measure the environment surrounding the autonomous vehicle. For example, the retroreflective sections 104 can reflect in a non-visible portion of the electromagnetic section. More specifically, the retroreflective sections 104 can include a filter (e.g., narrow-band filter) to receive and reflect a specific frequency of the electromagnetic spectrum. For example, a narrow band frequency could be chosen to be reflected, and as long as that portion of the spectrum is included in the emission spectrum (e.g., broad-band or narrow-band), then the retroreflective sections 104 can reflect the predetermined frequency. The data gathered by the perception system (e.g., LIDAR) of the autonomous vehicle can assist the autonomous vehicle in operating autonomously. Additionally, more detailed information (e.g., more robust measurements) based on the one or more retroreflective sections 104 can correspond to more accurate operation of the autonomous vehicle, thereby improving performance and safety. For example, the retroreflective sections 104 can improve the autonomous vehicle's ability to detect the vehicle 102, calculate a volume of space that the vehicle 102 occupies, prevent false negatives in vehicle detection, and the like as further described herein.

In one aspect, the one or more retroreflective sections 104 can be faceted surfaces such that one or more of the retroreflective sections 104 are internally faceted, one or more of the retroreflective surfaces are externally faceted, or a combination thereof. In an aspect, the retroreflective sections 104 can be retroreflective paint comprising micro-faceted materials. In an embodiment, micro-faceted materials can be mixed with a liquid base such that the microfaceted materials are embedded (e.g., randomly, Monte Carlo distribution, etc.) such that the orientation of the micro-faceted materials that will correspond to a distribution that will be reflective from a wide range of angles.

The retroreflective sections 104, when illuminated, can return at least a portion of the incoming radiation (e.g. from a perception system) back to the source in the same direction from which the retroreflective section 104 was illuminated. The retroreflective sections 104 can be active reflectors in that the retroreflective sections 104 can be illuminated when a source is actively illuminating the retroreflective sections 104. In other words, the retroreflective sections 104 can reflect with a high intensity when a source of illumination is specifically directed at the retroreflective section 104. Additionally, the reflection and resulting illumination can be in a non-visible portion of the electromagnetic spectrum.

The retroreflective sections 104 can be tuned to a non-visible portion of the electromagnetic spectrum (e.g., via a filter). The retroreflective sections 104 can be tuned to a specific frequency in the non-visible portion of the electromagnetic spectrum corresponding to a perception system, hyperspectral camera, an infrared camera, one or more sensors used by an autonomous vehicle to measure an environment surrounding the autonomous vehicle (e.g., LIDAR), and the like. More specifically, when a source illuminates the retroreflective sections 104, the return can have a higher intensity in a predetermined portion of the electromagnetic spectrum compared to other portions of the electromagnetic spectrum. Additionally, the intensity of the return can be invisible in the visible portion of the electromagnetic spectrum. In other words, the visible portion of the electromagnetic spectrum does not illuminate the retroreflective sections 104, while any illumination corresponding to the specific frequency to which the retroreflective sections 104 are tuned can have an intensity greater than a predetermined intensity. The tuning of the retroreflective section 104 can include a selection of materials, molecular make-up, particulate size, absorption and reflective properties of the materials that are highly performant given a predetermined band of frequencies that will be targeted. In an embodiment, a micro-facet based material can be selected an analyzed for its reflective properties, and once it has been characterized, the frequency spectrum that is the strongest and the most efficient to reflect can be determined. Then the emitter can be designed to concentrate radiation around that band. Alternatively, or additionally, the emitter can be analyzed to determine the target efficient frequency corresponding to the emitter and a material that has high performance in that band can be found based on the emitter. In other words, the retroreflective sections 104 can be brighter than a predetermined brightness in the predetermined portion of the electromagnetic spectrum when illuminated by a predetermined source such as a perception system of an autonomous vehicle (e.g., LIDAR).

The retroreflective sections 104 can be one or more retroreflective sections 104 disposed in predetermined locations on the vehicle 102. The predetermined locations on the vehicle 102 can correspond to the bounding box of the vehicle 102. The bounding box of the vehicle 102 can be the portions of the vehicle 102 that define the shape of the vehicle 102. In other words, the bounding box of the vehicle 102 can be the geometry of the vehicle. For example, the bounding box of the vehicle 102 can include a front left corner, a front right corner, a rear left corner, and a rear right corner of the vehicle 102, which can outline the shape of the vehicle 102. Additionally, the bounding box can correspond to a volume of space the vehicle 102 occupies. In other words, the volume of space within the bounding box of the vehicle 102 can be based on the retroreflective sections 104 because the retroreflective sections 104 can define the edges of the vehicle 102. More specifically, the volume of space that the vehicle 102 occupies can be calculated based on the position of the one or more retroreflective sections 104. In other words, the bounding box of the vehicle 102 can be based on the predefined positions of the retroreflective sections 104 which can correspond to a volume of space that should not be entered by an autonomous vehicle being operated autonomously. The retroreflective sections 104 can also be located on other portions of the vehicle 102 including the front, rear, top, bottom, and the like.

In another aspect, the one or more retroreflective sections 104 can be one or more connected sections (e.g., stripe) outlining the bounding box of the vehicle 102. In another aspect, placement of the retroreflective sections 104 can correspond to any location on the vehicle 102 that improves detectability by a perception system of autonomous vehicles. For example, the retroreflective sections may be placed at a predetermined height (e.g., eye level, ground level, sensor level, etc.) based on a position of the vehicle operator and/or one or more sensors of the autonomous vehicle. The retroreflective sections 104 may have a predetermined height and width optimized for detection.

The retroreflective sections 104 can improve detectability from a perception system (e.g., LIDAR) of an autonomous vehicle. More specifically, the retroreflective sections 104 can improve detectability of vehicles with black paint (or other dark colors), which are currently the most difficult for autonomous vehicle perception systems to detect. Additionally, detectability at night is significantly improved as the retroreflective sections 104 operate in the non-visible spectrum (i.e., a perception system of the autonomous vehicle can perceive the retroreflective sections 104 as bright regardless of the time of day). Further, the retroreflective sections 104 improve detectability in a variety of weather conditions (e.g., rain, snow, fog, etc.) because the perception system of the autonomous vehicle can perceive the retroreflective sections 104 as bright even in poor weather conditions.

Figure 2:
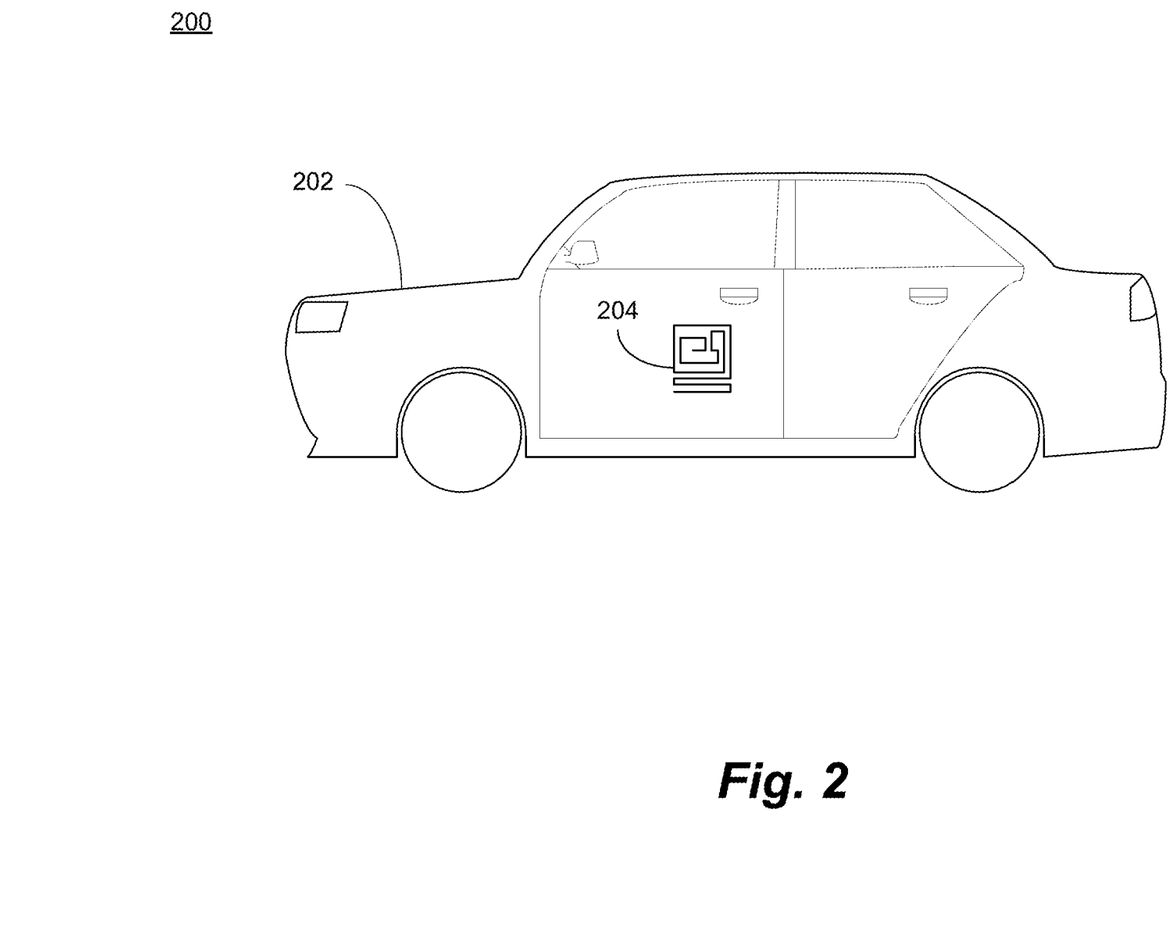
FIG. 2 depicts a vehicle including a unique retroreflective design according to one or more aspects of the disclosed subject matter.

FIG. 2 depicts a vehicle 202 including a unique retroreflective design 204 according to one or more aspects of the disclosed subject matter. The vehicle 202 and the integrated retroreflective design 204 can be an active non-visible reflection system 200. The retroreflective design 204 can be one or more retroreflective sections (e.g., retroreflective sections 104) and/or painted with retroreflective paint. The retroreflective design 204 can include embedded classification semantics (e.g., barcoded, QR coded, etc.) into the pattern of the retroreflective design 204. As described with respect to the retroreflective sections 104, the retroreflective design 204 can be tuned to a specific frequency in the electromagnetic spectrum and provide a high intensity return in a non-visible portion of the electromagnetic spectrum for the perception system (e.g., LIDAR) of the autonomous vehicle. Each retroreflective design 204 can be unique such that the embedded classification semantics of the retroreflective design 204 can correspond to predetermined information. For example, the retroreflective design 204 can be detected by a perception system of an autonomous vehicle (e.g., LIDAR). The retroreflective design 204 can then be compared to stored retroreflective designs where each retroreflective design is associated with predetermined information. For example, the retroreflective design 204 may correspond to the make and model of the vehicle 202. More specifically, in response to detecting the retroreflective design 204 via the perception system of the autonomous vehicle, the autonomous vehicle may know the make and model of the car, as well as additional relevant information including the dimensions of the vehicle 202, the owner of the vehicle, vehicle maintenance information, and the like. In an embodiment, the embedded classification semantics can be a pattern (e.g., bar code, QR code, etc.) embedded in a predetermined location (e.g., on a vehicle, on a street sign, on any road marking, stop light, any transportation related object, etc.). For example, the embedded pattern can be painted on a road sign and the pattern can correspond to "stop sign" regardless of the writing on it or shape of the sign. This can be, advantageous because the sign can be identified via the pattern regardless of county, language, transportation laws, etc. In other words, a complete classification system can be used to identify any object via the predetermined patterns (e.g., embedded classification semantics). In an embodiment, the predetermined pattern can be repeated across the object. In an embodiment, the embedded classification semantics can be embedded as a machine readable design (e.g., bar code, QR code, binary, error correcting code, etc.). Additionally, the embedded classification semantics can be incorporated such that the micro-faceted materials do not reflect in the visible spectrum.

As a result, the autonomous vehicle can modify autonomous operational behavior based on a more robust classification of the detected vehicle 202 via the embedded classification semantics. Additionally, the classification of the type of vehicle can include a taxi, school bus, police car, ambulance, and the like which may further define the autonomous operation of the autonomous vehicle. The classification of the vehicle 202, as well as any additional relevant information corresponding to the retroreflective design 204 based on the embedded classification semantics, can be more accurate, provide more efficient processing, and provide significantly more information compared to taking measurements of the vehicle 202 itself. The retroreflective design 204 can therefore reduce misclassification, reduce false negatives, improve visibility of difficult vehicles to detect (e.g., vehicles painted black), improve detection at night, improve autonomous operation based on information that is not readily measurable by the perception system of the autonomous vehicle (e.g., owner of the vehicle, maintenance information, etc.), and the like, for example.

In another aspect, the retroreflective design 204 can be integrated into various objects to be detected by a perception system of an autonomous vehicle. For example, the retroreflective design 204 can be integrated into street lights, mailboxes, lane markings, road markings, street signs, other infrastructure, and the like.

One or more retroreflective designs 204 can be placed anywhere on the vehicle 202. Further, the retroreflective sections 104 described in FIG. 1 can be used in combination with the retroreflective design 204. For example, the retroreflective sections 104 can improve detectability and provide robust measurements, and the retroreflective design 204 can provide additional relevant information including the make and model of the vehicle, whether or not the vehicle is a specialty vehicle (e.g., emergency vehicle), as well as known dimensions of the vehicle to supplement any measurements based on the retroreflective sections 104. The combination of the retroreflective designs 204 and the retroreflective sections 104 can improve detectability and classification of the vehicle. For example, aftermarket modifications of a vehicle might change the height of a vehicle (e.g., installing a lift kit on a jeep), which may be more easily detected using the retroreflective sections 104. Alternatively, or additionally, the aftermarket modification information can be included in the retroreflective design 204 so that when the autonomous vehicle detects the retroreflective design 204, updated information (e.g., dimensions) of the vehicle corresponds to any aftermarket changes. Updates to the information associated with the retroreflective design 204 can be received over a network, for example.

Figure 3A:
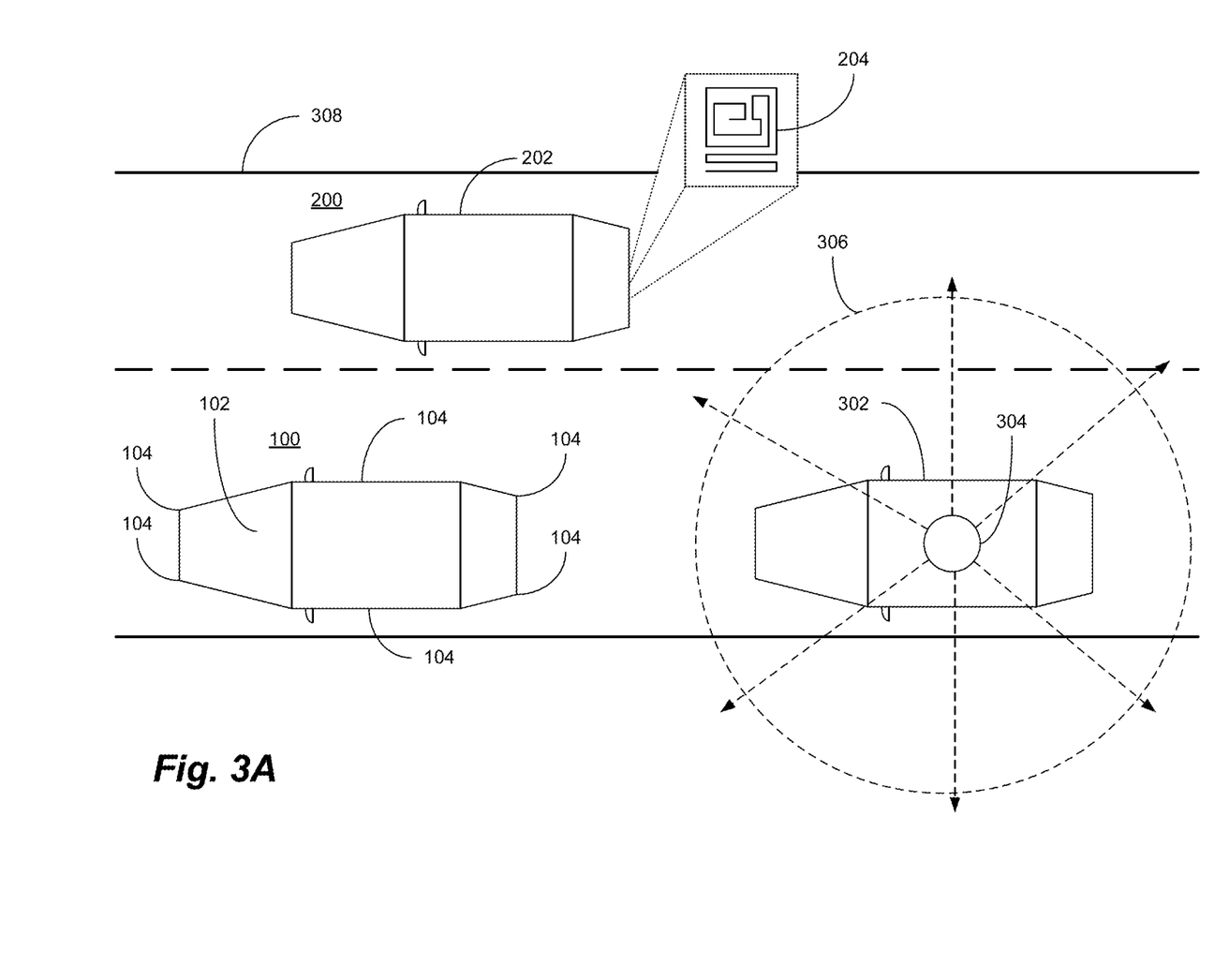
FIG. 3A depicts an active non-visible reflection system according to one or more aspects of the disclosed subject matter.

FIG. 3A depicts an active non-visible reflection system 100, 200 according to one or more aspects of the disclosed subject matter.

The active non-visible reflection system can include one or more vehicles (e.g., vehicle 102, vehicle 202, etc.) and one or more of the retroreflective sections 104 and/or the retroreflective design 204 integrated into the one or more vehicles 102, 202. Autonomous vehicle 302 can be equipped with a perception system 304 (e.g., LIDAR). The perception system 304 can sweep the area measuring distance, intensity of a return, and the like, for example. LIDAR systems can include 64 lasers to compute 1.4 million distance measurements and corresponding intensities for each measurement, for example. The area that the perception system 304 can sweep is indicated by area 306, which can extend past the circle depicted in FIG. 3A. The circle depicted in FIG. 3A simply indicates that the perception system 304 can sweep the environment of the autonomous vehicle 302 in 360°, while the arrows radiating from the perception system 304 indicate that the range of the perception system 304 extends past the circle.

On a road 308, the autonomous vehicle 302 can detect the vehicles 102, 202 based on the retroreflective sections 104 and the retroreflective design 204, respectively. However, as described above, each of vehicle 102 and vehicle 202 can include both the retroreflective sections 104 and the retroreflective design 204 working in combination on either of the vehicles 102, 202. As the perception system 304 of the autonomous vehicle 302 transmits a non-visible detection signals (e.g., LIDAR) to measure the environment surrounding the autonomous vehicle 302, the retroreflective sections 104 and the retroreflective design 204 can provide a return back to the source (i.e., perception system 304) in the same direction from which the source transmitted the LIDAR radiation. Additionally, the intensity of the return from the retroreflective sections 104 and the retroreflective design 204 can be greater than a predetermined intensity (e.g., the intensity expected from a non-retroreflective surface) which can allow the retroreflective sections 104 and the retroreflective design 204 to appear bright relative to the perception system 304. As a result, the vehicles 102, 202 are easily detectable by the autonomous vehicle 302, thereby improving autonomous vehicle operation.

Figure 3B:
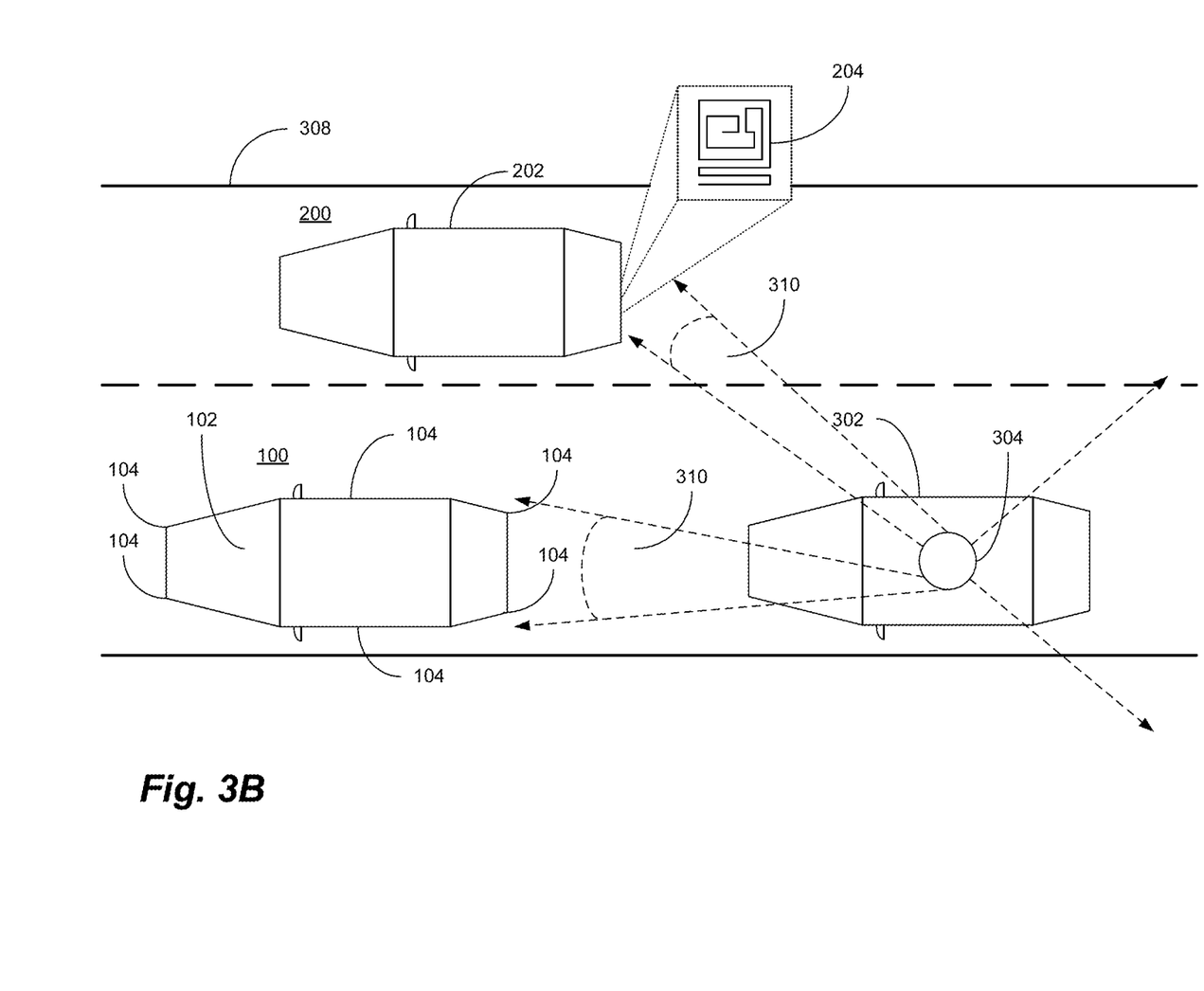
FIG. 3B depicts an active non-visible reflection system including a more detailed scan of one or more areas according to one or more aspects of the disclosed subject matter.

FIG. 3B depicts an active non-visible reflection system 100, 200 including a more detailed scan of one or more areas according to one or more aspects of the disclosed subject matter.

The perception system 304 can take more detailed measurements of one or more specific areas 310 in the environment of the autonomous vehicle 302. For example, as the perception system 304 broadly sweeps the area 306 depicted in FIG. 3A, the perception system 304 can detect a return with an intensity greater than a predetermined intensity (e.g., from retroreflective sections 104 and/or retroreflective design 204). As a result of detecting an area with a high intensity return, the perception system 304 can take more detailed measurements of the one or more areas 310. Taking more detailed measurements of the one or more areas 310 can provide significantly more information of the one or more areas 310 including more detailed measurements of the vehicles 102, 202, more accurate positioning of the vehicles 102, 202, and the like, for example. Additionally, the one or more areas 310 can correspond to other infrastructure that provided a high intensity return via retroreflective sections 104 and/or retroreflective designs 204 including street lights, street signs, buildings, lane markings, road markings, and the like.

In one aspect, a combination of the retroreflective sections 104 and the retroreflective design 204 can be integrated into the same vehicle. The perception system 304 can first detect a high intensity return provided by the retroreflective sections 104. Once the high intensity return is detected, the perception system 304 can redirect at least a portion of the perception system 304 to scan the one or more areas 310 in more detail. Having scanned the one or more areas 310 in more detail, the perception system 304 may then discover the retroreflective design 204, which can allow the autonomous vehicle to gather the additional information corresponding to the embedded classification semantics of the retroreflective design 204.

Figure 4:
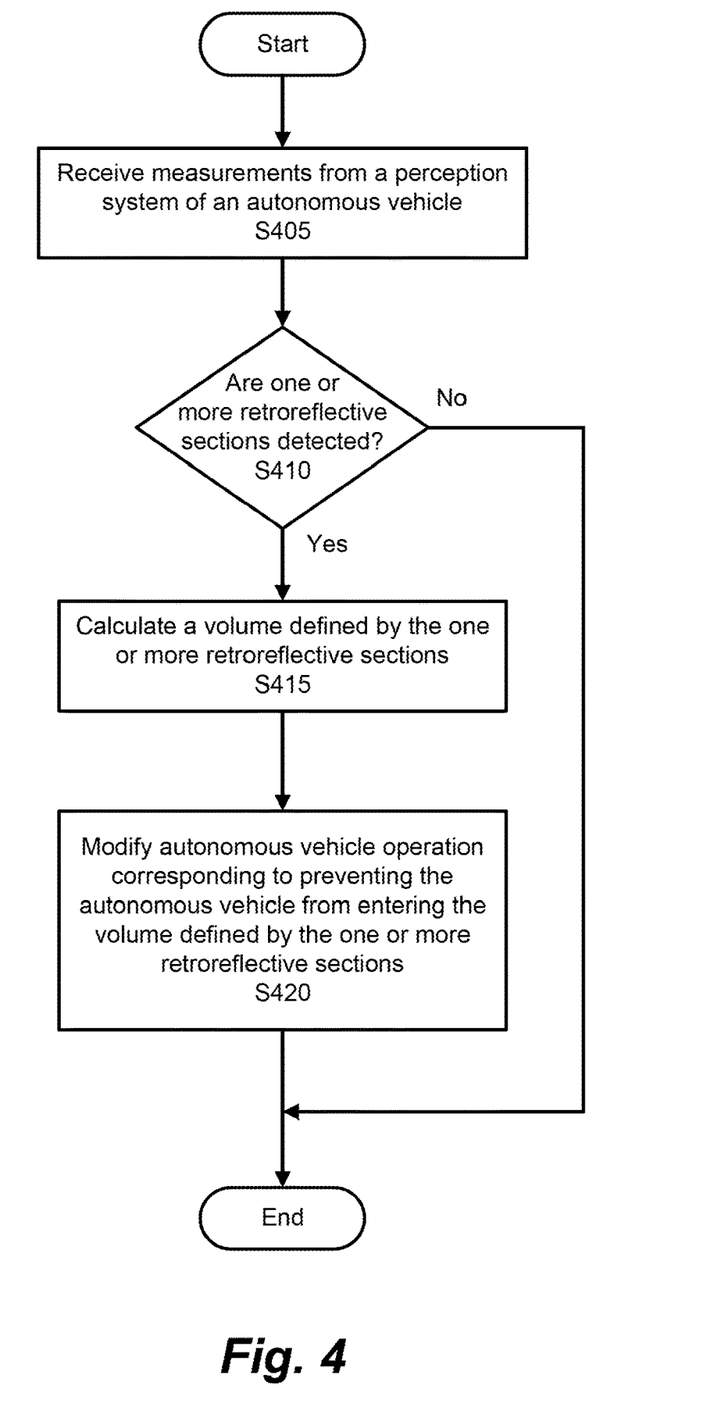
FIG. 4 is an algorithmic flow chart of a method for detecting one or more retroreflective sections of an object according to one or more aspects of the disclosed subject matter.

FIG. 4 is an algorithmic flow chart of a method for detecting one or more retroreflective sections 104 of an object according to one or more aspects of the disclosed subject matter.

In S405, measurements can be received from the perception system 304 (e.g., LIDAR) of the autonomous vehicle 302, the measurements being received by processing circuitry disposed in the autonomous vehicle 302, for example. The perception system 304 can scan the environment of the autonomous vehicle 302 taking various measurements including distance and intensity of a return. A return with intensity greater than a predetermined intensity can correspond to one or more retroreflective sections 104.

In S410, it can be determined if one or more retroreflective sections 104 are detected by the perception system 304.

If one or more retroreflective sections 104 are not detected, the process can end. However, if one or more retroreflective sections 104 are detected, then a volume defined by the one or more retroreflective sections 104 can be calculated in S415. The retroreflective sections 104 can be detected based on the intensity of a return being greater than a predetermined intensity. In other words, the area including the retroreflective sections 104 can be brighter according to the perception system 304 than areas that do not include retroreflective sections 104.

In S415, a volume defined by the one or more retroreflective sections 104 can be calculated. The calculation of the volume defined by the one or more retroreflective sections 104 can be based on the positions of the retroreflective sections 104. In one aspect, the object can be a vehicle (e.g., vehicle 102). More specifically, the retroreflective sections 104 can be integrated along a bounding box of the vehicle 102, the bounding box defining the dimensions and/or geometries of the vehicle 102.

In S420, a modification the operation of the autonomous vehicle 302 can be added. For example, the modification can include preventing the autonomous vehicle 302 from entering the volume defined by the one or more retroreflective sections 104. More specifically, the calculation of the volume defined by the one or more retroreflective sections 104 can correspond to an area in the environment of the autonomous vehicle 302 that the autonomous, vehicle 302 can avoid entering (e.g., collision avoidance). The robust measurement of the volume of the vehicle 102 can improve the operation of the autonomous vehicle while also preventing false negatives in detecting vehicle 102 and improving detection at night and in various weather conditions, for example. After the modification is added to the autonomous vehicle operation, the process can end.

Figure 5:
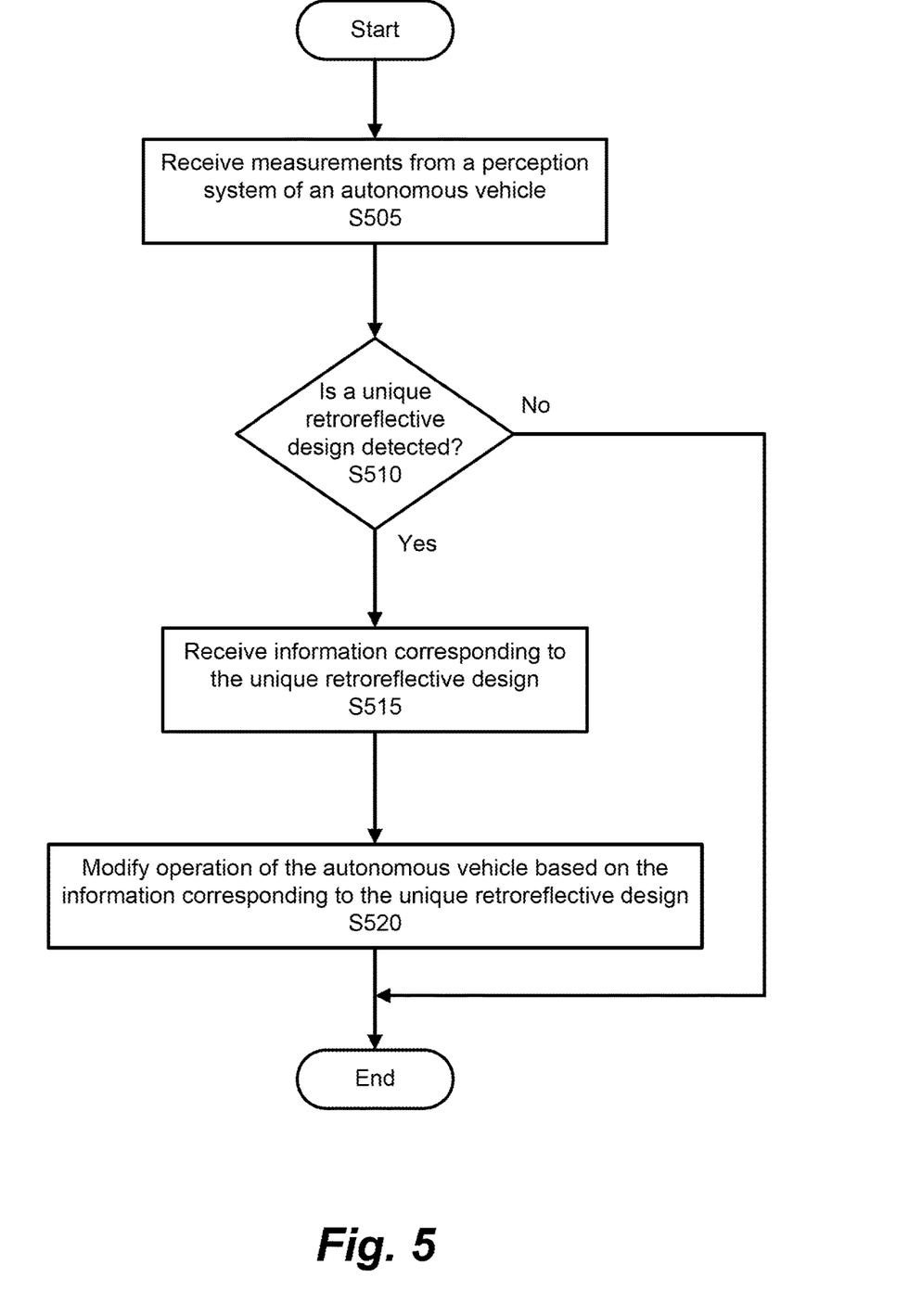
FIG. 5 is an algorithmic flow chart of a method for detecting a unique retroreflective design according to one or more aspects of the disclosed subject matter.

FIG. 5 is an algorithmic flow chart of a method for detecting a unique retroreflective design according to one or more aspects of the disclosed subject matter.

In S505, measurements from a perception system 304 of an autonomous vehicle 302 can be received by processing circuitry of the autonomous vehicle 302 as similarly described in S405 of FIG. 4.

In S510, it can be determined if a unique retroreflective design 204 is detected. If the retroreflective design 204 is not detected, the process can end. However, if the retroreflective design 204 is detected, then information corresponding to the unique retroreflective design 204 can be received in S515. The retroreflective design 204 can include embedded classification semantics corresponding to relevant information for the autonomous vehicle 302.

In S515, information corresponding to the retroreflective design 204 can be received. The information can correspond to the embedded classification semantics. The embedded classification semantics can be determined by comparison to a database of retroreflective designs, for example. The database can be stored locally and/or remotely and can be accessed by the autonomous vehicle 302 over a network. For example, the retroreflective design 204 can include a make and model of the vehicle 202, a current owner of the vehicle 202, maintenance history of the vehicle 202, as well as indicating if the vehicle is a police car, ambulance, fire truck, school bus, taxi, garbage truck and the like to provide robust obstacle detection and classification. Additionally, the information received in response to detecting the retroreflective design 204 can provide improved autonomous vehicle decision-making and more robust behavior prediction.

In S520, operation of the autonomous vehicle 302 can be updated and/or modified based on the information corresponding to the unique retroreflective design 204. For example, if the embedded classification semantics associated with the retroreflective design 204 indicate that the vehicle 202 is a school bus, the operation of the autonomous vehicle 302 can be updated with the information that the school bus may make frequent stops, especially on week days before and after school. After the operation of the autonomous vehicle 302 is updated based on the information corresponding to the retroreflective design 204, the process can end.

Figure 6:
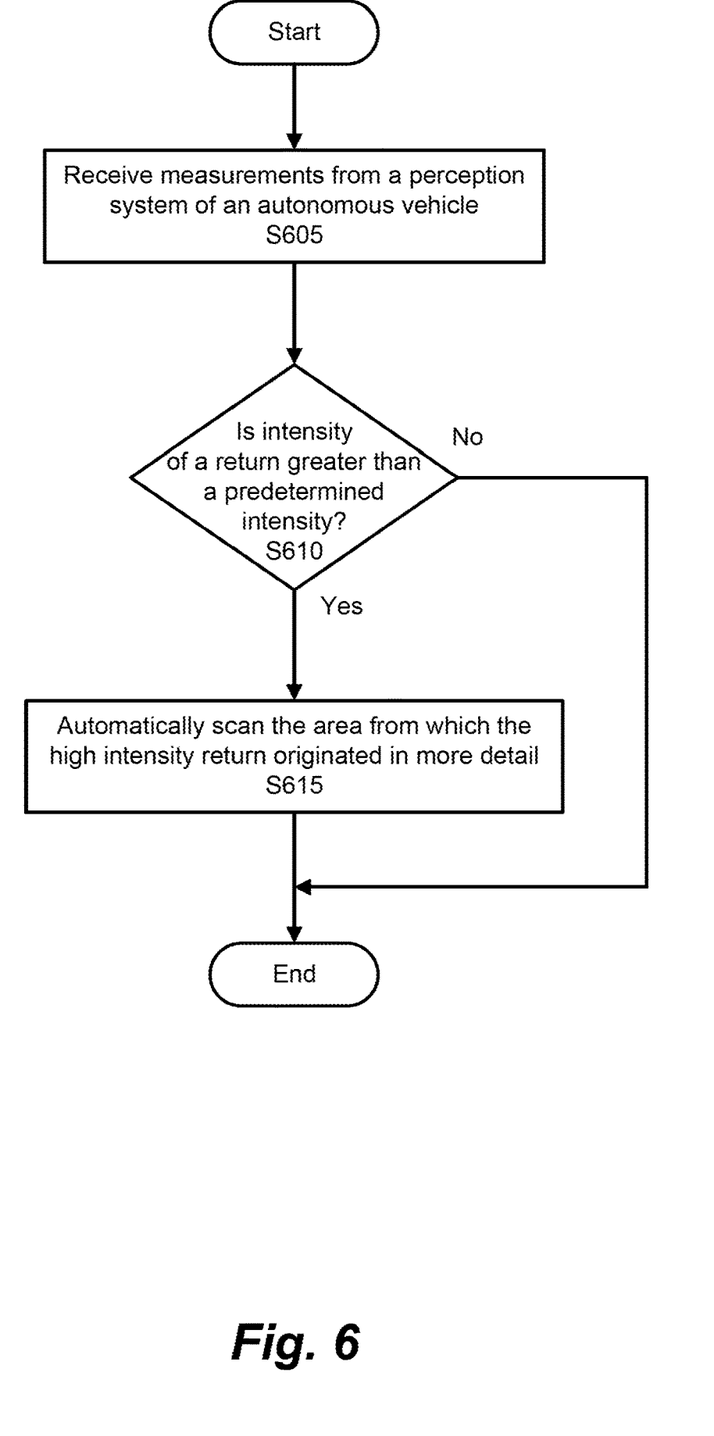
FIG. 6 is an algorithmic flow chart of a method for automatically performing an additional scan in response to detecting one or more retroreflective sections according to one or more aspects of the disclosed subject matter.

FIG. 6 is an algorithmic flow chart of a method for automatically performing an additional scan in response to detecting one or more retroreflective sections 104 and/or retroreflective designs 204 according to one or more aspects of the disclosed subject matter.

In S605, measurements from the perception system 304 of the autonomous vehicle 302 can be received by processing circuitry of the autonomous vehicle 302 as similarly described in S405 and S505 of FIG. 4 and FIG. 5, respectively.

In S610, it can be determined if intensity of a return is greater than a predetermined intensity. If the intensity of the return is greater than the predetermined intensity, then it can be determined that the area from which the high intensity return originated includes one or more retroreflective sections 104 and/or one or more retroreflective designed 204. If the intensity of the return is not greater than the predetermined intensity, the process can end. However, if the intensity of the return is greater than the predetermined intensity, the area from which the high intensity return originated can automatically be scanned in more detail in S615.

In S615, the area from which the high intensity return originated (e.g., area 310) can automatically be scanned in more detail. Because the high intensity return can correspond to a location of one or more retroreflective sections 104 and/or one or more retroreflective designs 204, the area with the high intensity return is an area in the environment of the autonomous vehicle 302 with important information. For example, the area with a high intensity return can be one or more retroreflectors 104 defining a volume occupied by the vehicle 102. Any additional information about the vehicle 102 and/or the area that the vehicle 102 occupies may affect the operation of the autonomous vehicle 302. In response to detecting the high intensity return, the perception system 304 of the autonomous vehicle 302 can redirect the scan to specifically scan the area from which the high intensity return originated in more detail. The more detailed scan can correspond to significantly more measurements to provide more robust autonomous vehicle operation. Additionally, the high intensity return can act as a trigger for proactively more detailed scanning, thereby improving energy efficiency by focusing any emitted energy on areas that have already provided a strong, validated high intensity return. The more detailed scan can provide even more detailed information about specific areas of interest in the environment of the autonomous vehicle 302.

It should be appreciated that the area from which a return originated can be from more than one area in the environment surrounding the autonomous vehicle 302 as depicted in FIG. 3B. Therefore, the more detailed scan can occur simultaneously if more than one area of interest is detected. Alternatively, or additionally, the more detailed scans can occur in a predetermined order (e.g., the order in which the areas of interest were detected).

The steps of FIG. 4, FIG. 5, and FIG. 6 can occur in another order and/or simultaneously.

Next, a hardware description of processing circuitry of the autonomous vehicle 302 according to exemplary embodiments is described. The processing circuitry of the autonomous vehicle 302 can perform various processing for the autonomous vehicle 302, such as calculate the volume occupied by the vehicle 102 based on the one or more retroreflective sections 104, for example. The processing circuitry of the autonomous vehicle 302 can be a computer, circuitry, a laptop, a tablet, a smart, phone, a PDA, and the like integrated into the autonomous vehicle. The processing circuitry of the autonomous vehicle 302 includes a CPU which performs the processes described above/below. The process data and instructions may be stored in memory. These processes, and instructions may also be stored on a storage medium disk such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the remote device communicates, such as a server or computer.

Further, the claimed advancements may be provided as a utility application, background daemon, or component of an operating system, or combination thereof, executing in conjunction with the CPU and an operating system such as Microsoft Windows 7, UNIX, Solaris, LINUX, Apple MAC-OS and other systems known to those skilled in the art.

The hardware elements in order to achieve the processing circuitry of the autonomous vehicle 302 may be realized by various circuitry elements, known to those skilled in the art. For example, the CPU may be a Xenon or Core processor from Intel of America or an Opteron processor from AMD of America, or may be other processor types that would be recognized by one of ordinary skill in the art. Alternatively, the CPU may be implemented on an FPGA, ASIC, PLD or using discrete logic circuits, as one of ordinary skill in the art would recognize. Further, the CPU may be implemented as multiple processors cooperatively working in parallel to perform the instructions of the inventive processes described above.

Additionally, any updates to the information corresponding to the embedded classification semantics can be received by the autonomous vehicles via a network (e.g., Wi-Fi, Bluetooth, cellular, etc.), for example.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A method of active non-visible reflection, comprising:
actively reflecting at least a portion of a predetermined frequency of non-visible incoming radiation back to a source of the incoming radiation using retroreflective sections coupled to a front, rear, top and, bottom of an object that are illumined by the incoming radiation, the retroreflective sections defining a bounding box corresponding to a volume of the object,
enabling a perception system to determine that the retroreflective sections are detected in response to the illumination; and
enabling processing circuitry communicably coupled to the perception system to detect the object defined by the detected retroreflective sections and to calculate the volume of the bounding box,
wherein the retroreflective sections include a narrow-band filter tuned to the perception system.

2. The method of claim 1, wherein an intensity of the reflection is greater than a predetermined intensity.

3. The method of claim 1, wherein the perception system is communicably coupled to an autonomous vehicle.

4. The method of claim 3, wherein the processing circuitry is associated with the autonomous vehicle.

5. The method of claim 4, further comprising:
modifying on operation of the autonomous vehicle via the processing circuitry.

6. The method of claim 5, wherein the modifying of the operation of the autonomous vehicle includes preventing the autonomous vehicle from entering a space corresponding to the volume defined by the retroreflective sections.

7. The method of claim 1, wherein the narrow-band filter is comprised of a material that only reflects a non-visible portion of the electromagnetic spectrum.

8. The method of claim 1, further comprising:
enabling the perception system to determine that the retroreflective sections are detected in response to the illumination when an intensity of the reflection during a first sweep is greater than a predetermined intensity, and
enabling the perception system to perform a second sweep when the retroreflective sections are detected during the first sweep.

9. The method of claim 8, wherein the second sweep includes taking more detailed measurements than the first sweep.

10. An autonomous vehicle, comprising:
a perception system; and
processing circuitry configured to
receive output from the perception system, the output including an intensity of a return,
determine if retroreflective sections are detected based upon the output, the retroreflective sections coupled to a front, rear, top and, bottom of an object, defining a bounding box corresponding to a volume of the object, and including a narrow-band filter tuned to the perception system,
calculate the volume defined by the retroreflective sections, and
preventing the autonomous vehicle from entering a space corresponding to the volume defined by the retroreflective sections.

11. The autonomous vehicle of claim 10, wherein the retroreflective sections are configured to actively reflect at least a portion of non-visible incoming radiation back to a source of the incoming radiation when the retroreflective sections are illuminated by the incoming radiation.

12. The autonomous vehicle of claim 11, wherein the retroreflective sections are detected when an intensity of the reflection is greater than a predetermined intensity.

13. The autonomous vehicle of claim 11, wherein the narrow-band filter is comprised of a material that only reflects a non-visible portion of the electromagnetic spectrum.

14. The autonomous vehicle of claim 13, wherein the perception system transmits the radiation at a predetermined frequency corresponding to the narrow-band filter.

15. The autonomous vehicle of claim 10, wherein the object is a vehicle.

16. The autonomous vehicle of claim 10, wherein the processing circuitry is configured to:
determine that the retroreflective sections are detected when an intensity of a reflection during a first sweep is greater than a predetermined intensity, and
perform a second sweep when the retroreflective sections are detected during the first sweep.

17. The autonomous vehicle of claim 16, wherein the second sweep includes taking more detailed measurements than the first sweep.

18. The autonomous vehicle of claim 17, wherein the intensity of the reflection is greater than the predetermined intensity by virtue of the narrow-band filter.

19. A method, comprising:
receiving output from a perception system, the output including an intensity of a return;
determining if retroreflective sections are detected based upon the output, the retroreflective sections coupled to a front, rear, top and, bottom of an object, defining a bounding box corresponding to a volume of the object, and including a narrow-band filter tuned to the perception system;
calculating the volume defined by the retroreflective sections; and
preventing an autonomous vehicle from entering a space corresponding to the volume defined by the retroreflective sections.

20. The method of claim 19, further comprising:
actively reflecting at least a portion of non-visible incoming radiation back to a source of the incoming radiation via the retroreflective sections when the retroreflective sections are illuminated by the incoming radiation.

21. The method of claim 20, further comprising:
detecting the retroreflective sections when an intensity of the reflection is greater than a predetermined intensity.

22. The method of claim 20, wherein the narrow-band filter is comprised of a material that only reflects a non-visible portion of the electromagnetic spectrum.

23. The method of claim 22, wherein the perception system transmits the radiation at a predetermined frequency corresponding to the narrow-band filter.

24. The method of claim 19, wherein the object is a vehicle.

25. The method of claim 19, further comprising:
determining that the retroreflective sections are detected when an intensity of a reflection during a first sweep is greater than a predetermined intensity, and
performing a second sweep when the retroreflective sections are detected during the first sweep.

26. The method of claim 25, wherein the second sweep includes taking more detailed measurements than the first sweep.

* * * * *